(12) United States Patent
Ito et al.

(10) Patent No.: US 8,701,348 B2
(45) Date of Patent: Apr. 22, 2014

(54) SLIDE DOOR DEVICE FOR VEHICLE

(71) Applicant: Aisin Seiki Kabushiki Kaisha, Kariya (JP)

(72) Inventors: Yoshichika Ito, Toyoake (JP); Junji Yamaguchi, Chiryu (JP); Tomohide Kato, Toyoake (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/762,943

(22) Filed: Feb. 8, 2013

(65) Prior Publication Data

US 2013/0205671 A1 Aug. 15, 2013

(30) Foreign Application Priority Data

Feb. 9, 2012 (JP) ................................. 2012-026457

(51) Int. Cl.
*E05F 11/00* (2006.01)

(52) U.S. Cl.
USPC ............... 49/360; 49/221; 49/213; 49/215; 49/218; 49/223

(58) Field of Classification Search
USPC ........... 49/360, 209, 210, 211, 213, 214, 215, 49/216, 218, 219, 220, 221, 223
See application file for complete search history.

(56) References Cited

U.S. PATENT DOCUMENTS

| 6,328,374 | B1 | * | 12/2001 | Patel | 296/155 |
| 6,611,990 | B1 | * | 9/2003 | Sogo et al. | 16/87 R |
| 8,152,221 | B2 | * | 4/2012 | Yoshioka | 296/155 |
| 8,308,221 | B2 | * | 11/2012 | Kitayama | 296/155 |
| 2005/0062313 | A1 | * | 3/2005 | Barczynski et al. | 296/155 |
| 2011/0089714 | A1 | * | 4/2011 | Kitayama | 296/155 |

FOREIGN PATENT DOCUMENTS

| EP | 1 362 730 B1 | 11/2006 | | |
| JP | 62110525 A | * 5/1987 | ................. | B60J 5/06 |
| JP | 04238987 A | * 8/1992 | ............. | E05F 15/18 |
| JP | 2003-335136 A | 11/2003 | | |
| JP | 2008-38403 A | 2/2008 | | |
| JP | 2008-49946 A | 3/2008 | | |
| JP | 2009-114782 A | 5/2009 | | |

* cited by examiner

*Primary Examiner* — Jerry Redman

(74) *Attorney, Agent, or Firm* — Buchanan Ingersoll & Rooney PC

(57) ABSTRACT

Provided is a slide door device for a vehicle, including: a body side lower rail disposed below a door opening formed on a side of a vehicle body and extends in a front-rear direction; a body side rail disposed above the body side lower rail and behind the door opening and extends in the front-rear direction; a door side lower guide roller unit and a door side guide roller unit connected to a slide door and configured to slide on the body side lower rail and the body side rail respectively; a door side lower rail disposed in a lower portion of the slide door positioned below the floor surface in the door opening and extends in the front-rear direction; and a body side lower guide roller unit connected to the lower portion of the door opening and configured to slide on the door side lower rail.

5 Claims, 6 Drawing Sheets

SLIDE DOOR DEVICE FOR VEHICLE

CROSS REFERENCE TO RELATED APPLICATIONS

This application is based on and claims priority under 35 U.S.C. §119 to Japanese Patent Application 2012-26457, filed on Feb. 9, 2012, the entire content of which is incorporated herein by reference.

TECHNICAL FIELD

This disclosure relates to a slide door device for a vehicle.

BACKGROUND DISCUSSION

In the related art, various devices are suggested as a slide door device for a vehicle. As shown in FIG. 5, for example, in a slide door device for a vehicle disclosed in JP 2003-335136A (Reference 1), a body side lower rail 81 is installed along a lower edge of a door opening 80a which is formed on the side of a vehicle body 80, and a body side center rail 82 is installed in a rear quarter panel 80b of the door opening 80a. In addition, a body side guide roller unit 83 is connected to the rear upper side of the body side lower rail 81, and the body side guide roller unit 83 is connected to the front lower side of the body side center rail 82.

On the other hand, in a slide door 86, a door side guide roller unit 87 which can slide on the body side lower rail 81 is connected to the front-side lower portion, and the door side guide roller unit 87 which can slide on the body side center rail 82 is connected to the rear-side intermediate portion. Moreover, in the slide door 86, a slidable door side lower rail 88 of the body side guide roller unit 83 is installed in the lower portion, and a slidable door side center rail 89 of the body side guide roller unit 83 is installed in the intermediate portion.

Accordingly, the door side guide roller units 87 and 87 slide on the body side lower rail 81 and the body side center rail 82 respectively, the body side guide roller units 83 and 83 slide on the door side lower rail 88 and the door side center rail 89 respectively, and thus, the slide door 86 opens and closes the door opening 80a. That is, in Reference 1, the body side upper rail which is installed along the upper edge of the door opening 80a or the door side guide roller unit which slides on the body side upper rail is eliminated, and thereby, application to the so-called slide door 86 without a door sash (door frame) can be realized.

In addition, as shown in FIG. 6, in a slide door device for a vehicle disclosed in JP 2008-49946A (Reference 2), a hinge 91 is installed on the rear end lower portion of a door opening 90a which is formed on the side of a vehicle body 90, and a body side center rail 92 is installed in a rear quarter panel 90b of the door opening 90a.

Moreover, a slide door (not shown) is inclined with respect to a front-rear direction due to the hinge 91 while sliding the door side guide roller unit on the body side center rail 92, and opens and closes the door opening 90a. Accordingly, also in Reference 2, the body side upper rail which is installed along the upper edge of the door opening 90a or the door side guide roller unit which slides on the body side upper rail is eliminated, and thus, application to a so-called sedan rear door can be realized.

Moreover, a slide door device for a vehicle disclosed in JP 2009-114782A (Reference 3) is similar to that of Reference 2.

However, in Reference 1, since the door side lower rail 88 and the door side center rail 89 are exposed to a vehicle interior, the design and structure of the slide door 86 (for example, door trim) are limited.

On the other hand, in References 2 and 3, since the hinge 91 is used for the opening and closing of the slide door, an opening-closing amount (door stroke) of the slide door is limited, and thus, the hinge cannot be applied to a slide door which needs a large opening-closing amount. Moreover, it is necessary to increase the size of the hinge 91 in order to support the slide door, and to secure a sufficient disposition space for the hinge around the lower portion of the slide door.

A need thus exists for a slide door device for a vehicle which is not susceptible to the drawback mentioned above.

SUMMARY

In order to solve the above described problems, according to an aspect of this disclosure, there is provided a slide door device for a vehicle, including: a body side lower rail which is disposed below a door opening formed on a side of a vehicle body and extends in a front-rear direction of the vehicle; a body side rail which is disposed above the body side lower rail and behind the door opening and extends in the front-rear direction; a door side lower guide roller unit which is connected to a slide door, which opens and closes the door opening, and configured to slide on the body side lower rail; a door side guide roller unit which is connected to the slide door and configured to slide on the body side rail; a door side lower rail which is disposed in a lower portion of the slide door positioned below the floor surface in the door opening and extends in the front-rear direction; and a body side lower guide roller unit which is connected to the lower portion of the door opening and configured to slide on the door side lower rail.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment disclosed here will be explained with reference to FIGS. 1 to 4.

Figure 1:
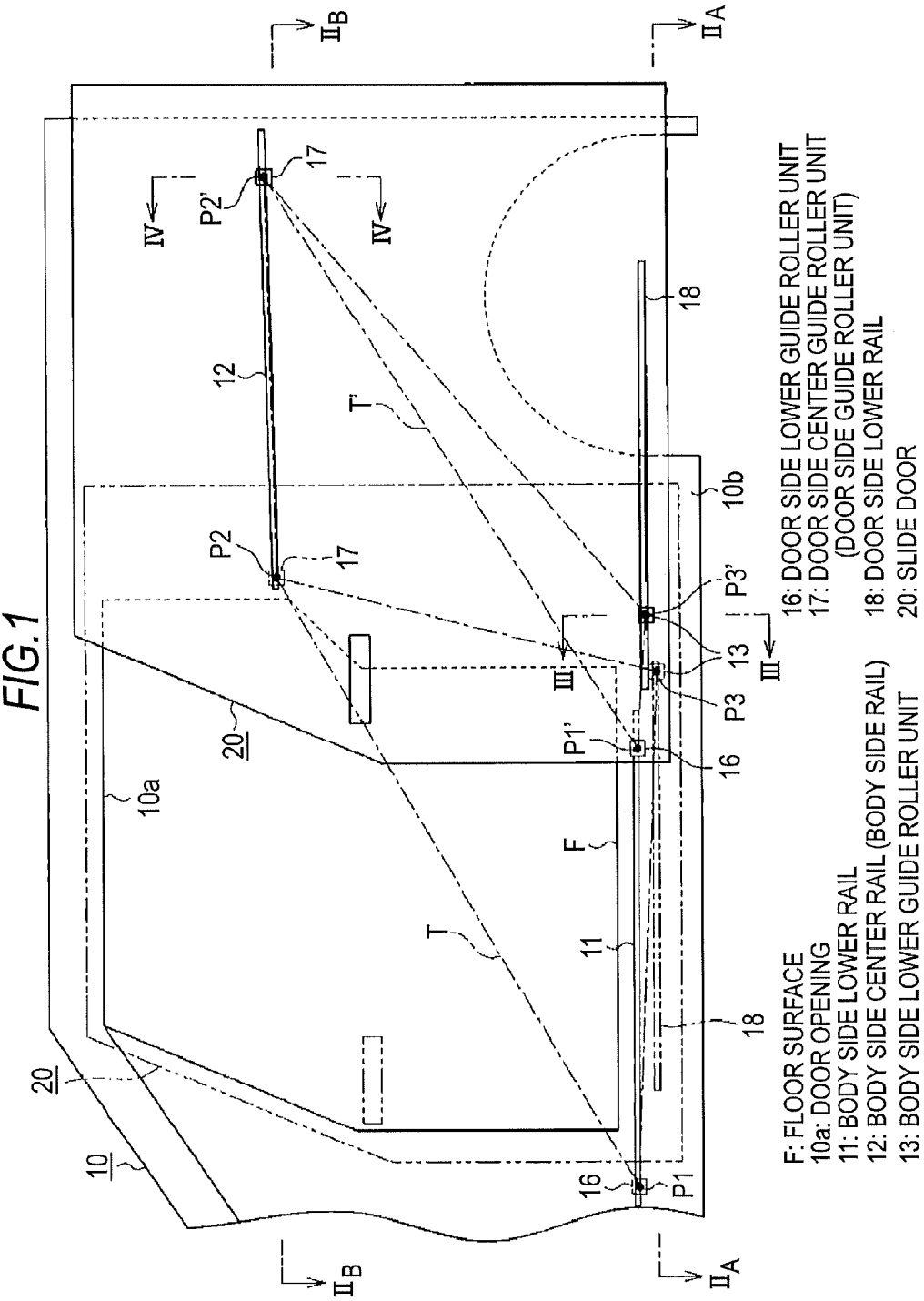
FIG. 1 is a schematic view showing an embodiment of this disclosure.
Figure 2:
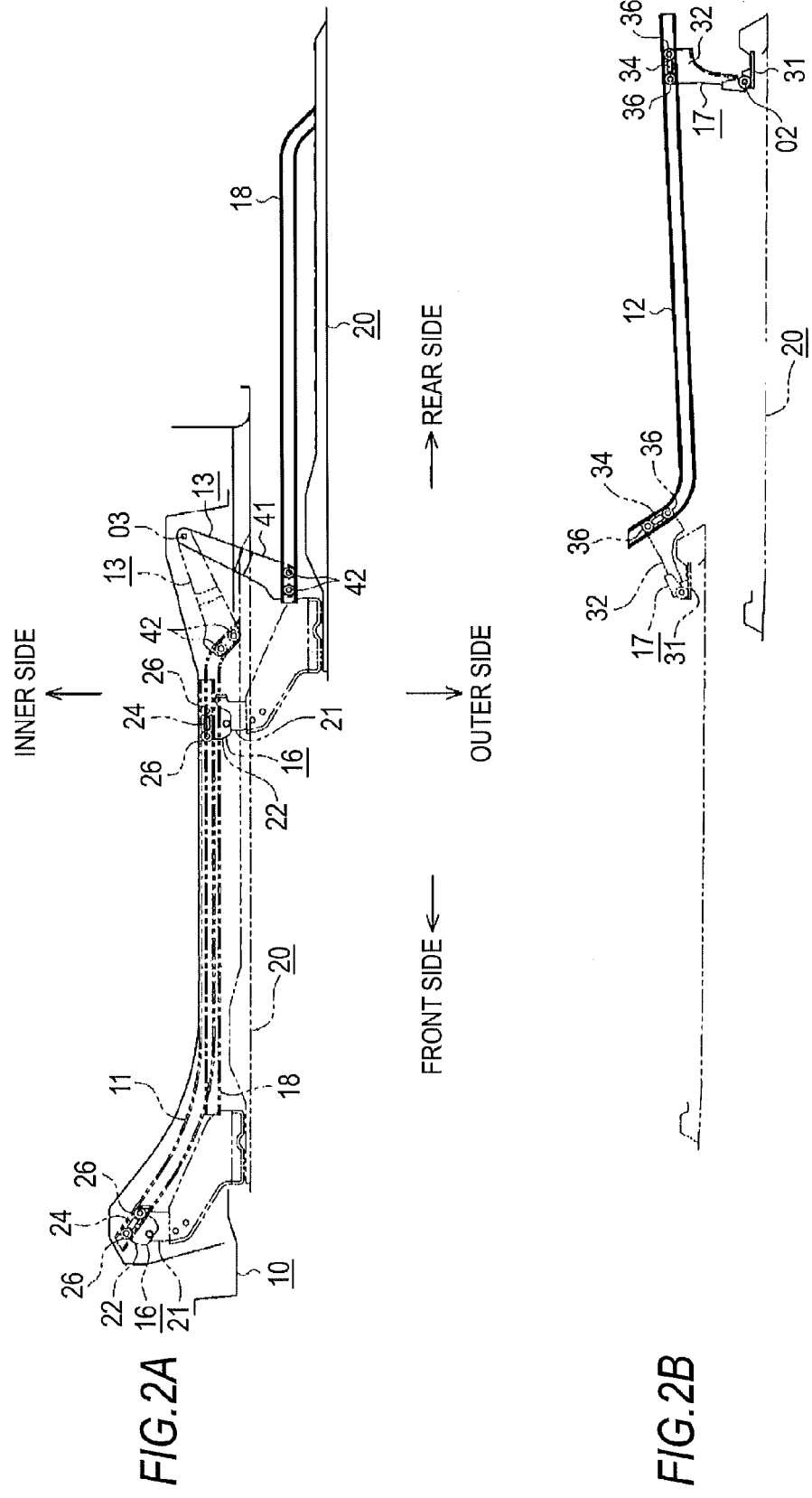
FIGS. 2A and 2B are cross-sectional views taken along line IIA-IIA and line IIB-IIB of FIG. 1.

As shown in FIG. 1, in a vehicle body 10, a body side lower rail 11 which is disposed below a door opening 10a formed on the side of the vehicle body extends in a front-rear direction. Moreover, in the vehicle body 10, a body side center rail 12, which is disposed in a quarter panel 10b which is positioned behind the door opening 10a in the intermediate portion in the height direction of the door opening 10a, extends in the front-rear direction. The body side lower rail 11 and the body side center rail 12 are parallel to each other. Moreover, in the vehicle body 10, a body side lower guide roller unit 13 is rotatably connected in the rear lower side of the body side lower rail 11.

On the other hand, in a slide door 20 which opens and closes the door opening 10*a*, a door side lower guide roller unit 16 which can slide on the body side lower rail 11 is rotatably connected to the front-side lower portion of the slide door, and a door side center guide roller unit 17 is rotatably connected to the intermediate portion in the height direction of the rear portion of the slide door. Moreover, in the slide door 20, a door side lower rail 18, which is disposed below a floor surface F in the door opening 10*a* and the body side lower rail 11 and so as to be offset backward to the body side lower rail 11, extends in the front-rear direction. The door side lower rail 18 is parallel to the body side lower rail 11 or the like, and the body side lower guide roller unit 13 can slide on the door side lower rail. That is, the slide door 20 is supported so as to move in the front-rear direction with respect to the vehicle body 10 via the door side lower guide roller unit 16, the body side lower rail 11, and the like.

In addition, according to the movement in the front-rear direction, the door side lower guide roller unit 16 and the door side center guide roller unit 17 slide on the body side lower rail 11 and the body side center rail 12 respectively and the body side lower guide roller unit 13 slides on the door side lower rail 18, and thus, the slide door 20 opens and closes the door opening 10*a*. The body side lower guide roller unit 13 is set so as to be always disposed behind the door side lower guide roller unit 16 regardless of the opening and closing positions of the slide door 20.

Moreover, the support position of the slide door 20 in the vehicle body 10 includes both support positions P1 and P2 of the door side lower guide roller unit 16 and the door side center guide roller unit 17 in the body side lower rail 11 and the body side center rail 12, and a support position P3 of the body side lower guide roller unit 13 in the door side lower rail 18. In addition, a height difference of the door side center guide roller unit 17 (support position P2) is set with respect to the door side lower guide roller unit 16 and the body side lower guide roller unit 13 (support positions P1 and P3), and the body side lower guide roller unit 13 (support position P3) is always disposed behind the door side lower guide roller unit 16 (support position P1). Accordingly, lines which connect two support positions of three support positions P1 to P3 necessarily draw a triangle T regardless of the opening and closing positions of the slide door 20. Particularly, the door side lower rail 18 is disposed below the body side lower rail 11, and the larger the separation distance from the door side center guide roller unit 17 (support position P2), the larger the triangle T. In FIG. 1, the support positions P1 to P3 and the triangle T is drawn as representatives of those equivalent to a full closing position of the slide door 20, and support positions P1', P2', and P3' and a triangle T' are also drawn as those equivalent to the full opening position of the slide door 20.

Next, the support structure of the slide door 20 will be further described.

Figure 3:
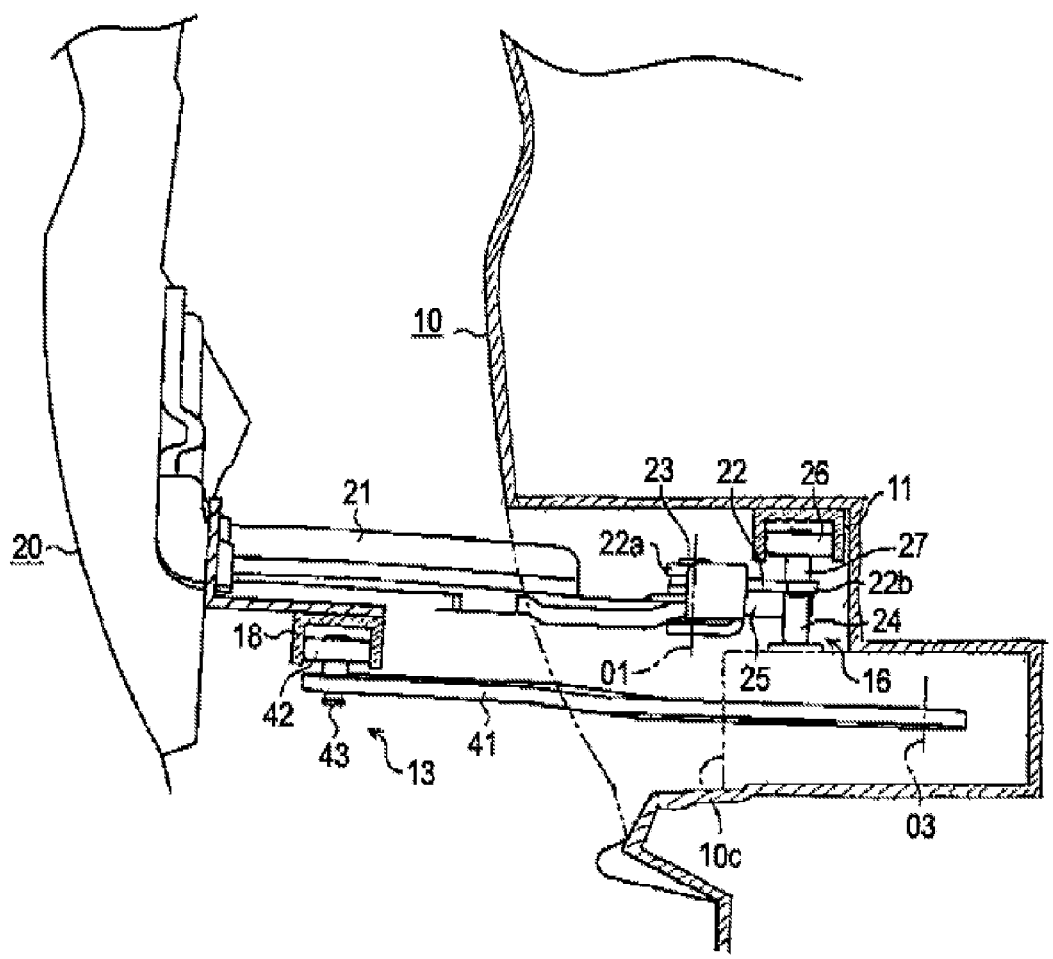
FIG. 3 is a cross-sectional view taken along line III-III of FIG. 1.

As shown in FIG. 2A, the front end portion of the body side lower rail 11 is bent toward a vehicle interior side. On the other hand, the door side lower guide roller unit 16 is rotatably connected to an arm member 21 which is secured to the front end portion of the slide door 20, and includes a guide bracket 22 which is formed of a metal plate, for example. As shown in FIG. 3, the guide bracket 22 includes an approximate U shaped connection portion 22*a* which is opened so as to face the tip portion of the arm member 21, and is rotatably connected to the arm member 21 (slide door 20) around an axis O1 which extends in the height direction using a support pin 23 which penetrates the connection portion 22*a* which sandwiches the tip portion of the arm member 21. In addition, in the guide bracket 22, the road roller 24 is pivotally supported by a support pin 25 in which the axis extends in a vehicle width direction, and a guide roller 26 is pivotally supported by a support pin 27 in which the axis extends in the height direction. Moreover, as shown in FIG. 2A, a pair of guide rollers 26 (and support pins 27) is disposed so as to sandwich the road roller 24 in the front-rear direction (rail length direction).

As shown in FIG. 3, both guide rollers 26 are mounted so as to roll on the body side lower rail 11, and thus, the door side lower guide roller unit 16 guides the movement of the slide door 20 along the body side lower rail 11, and the road roller 24 is mounted so as to roll on a support member 10*c* of the vehicle body 10, and thus, the door side lower guide roller unit supports the load of the slide door 20. In addition, as described above, the front end portion of the body side lower rail 11 is bent toward the vehicle interior side. Moreover, the door side lower guide roller units 16 are disposed in the front end portion and the rear end portion of the body side lower rail 11 in a fully closed state and a fully opened state of the slide door 20 respectively. Accordingly, the door side lower guide roller unit 16 which is guided in the body side lower rail 11 rotates the guide bracket 22 with respect to the arm member 21 around the support pin 23, and thus, front and rear movements of the slide door 20 are permitted.

Figure 4:
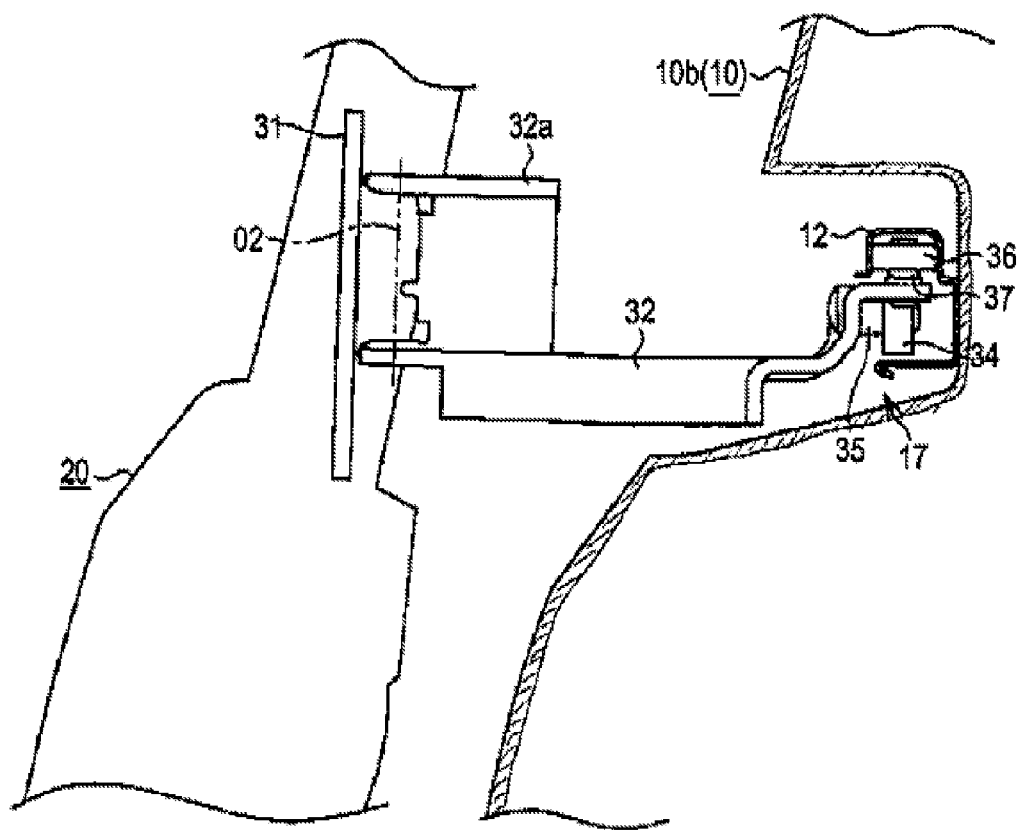
FIG. 4 is a cross-sectional view taken along line IV-IV of FIG. 1.
Figure 5:
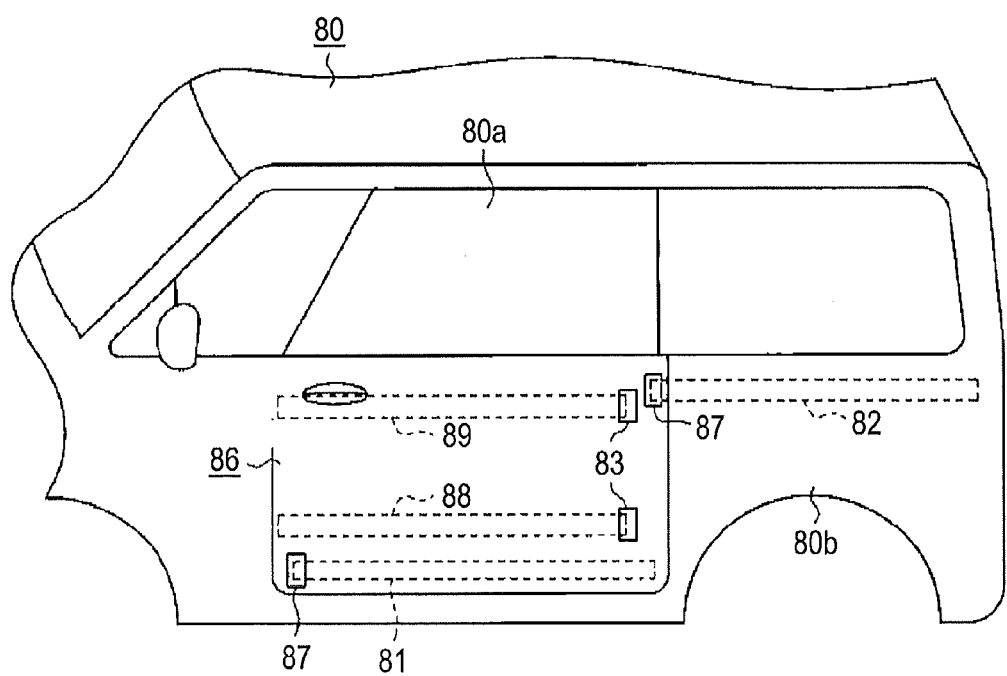
FIG. 5 is a perspective view showing an example of the related art.
Figure 6:
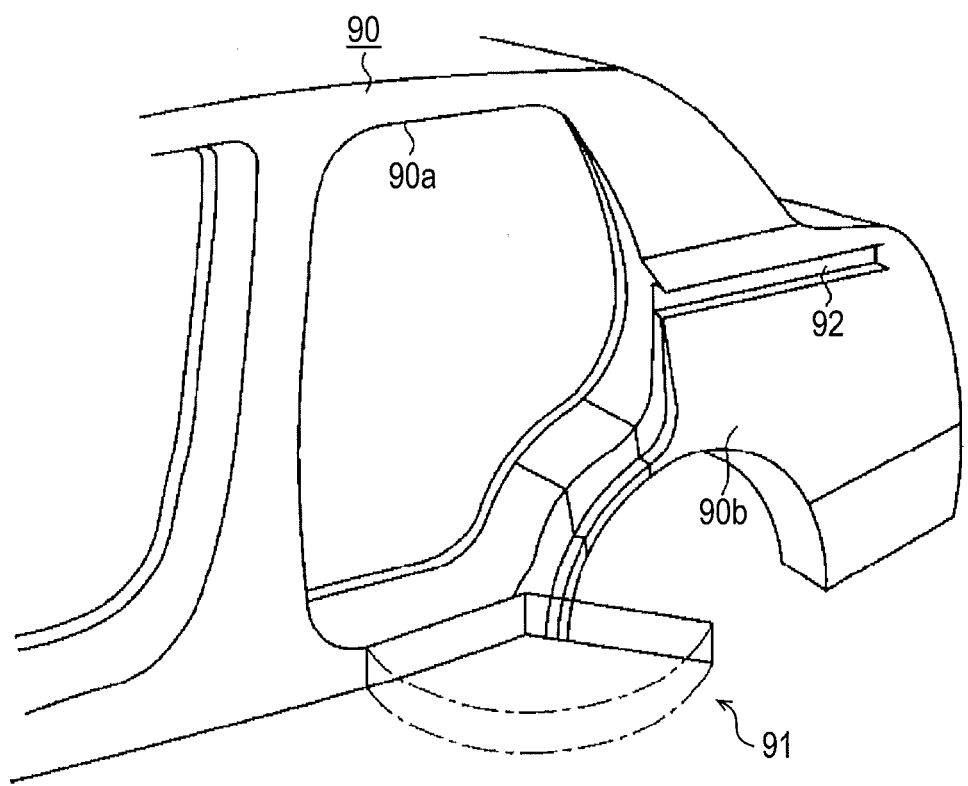
FIG. 6 is a perspective view showing another example of the related art.

As shown in FIG. 2B, the front end portion of the body side center rail 12 is also bent toward the vehicle interior side. On the other hand, the door side center guide roller unit 17 includes a guide bracket 32 which is rotatably connected to a bracket 31 fixed to the rear end portion of the slide door 20 and is formed of a metal plate, for example. As shown in FIG. 4, the guide bracket 32 includes an approximate U shaped connection portion 32*a* which is opened so as to face the tip portion of the bracket 31, and is rotatably connected to the bracket 31 (slide door 20) around an axis O2 which extends in the height direction using a support pin (not shown) which penetrates the connection portion 32*a* along with the tip portion of the bracket 31. In addition, in the guide bracket 32, a road roller 34 is pivotally supported by a support pin 35 in which the axis extends in a vehicle width direction, and a guide roller 36 is pivotally supported by a support pin 37 in which the axis extends in the height direction. Moreover, as shown in FIG. 2B, a pair of guide rollers 36 (and support pins 37) is disposed so as to sandwich the road roller 34 in the front-rear direction (rail length direction).

As shown in FIG. 4, both guide rollers 36 are mounted so as to roll on the upper portion of the body side center rail 12, and thus, the door side center guide roller unit 17 guides the movement of the slide door 20 along the body side center rail 12. Moreover, since the road roller 34 is mounted so as to roll on the bottom wall of the body side center rail 12, the door side center guide roller unit 17 supports the load of the slide door 20. In addition, as described above, the front end portion of the body side center rail 12 is bent toward the vehicle interior side. Moreover, the door side center guide roller units 17 are disposed in the front end portion and the rear end portion of the body side center rail 12 in the fully closed state and the fully opened state of the slide door 20 respectively. Accordingly, the door side center guide roller unit 17 which is guided in the body side center rail 12 rotates the guide bracket 32 with respect to the bracket 31 around the axis O2, and thus, front and rear movements of the slide door 20 are permitted.

As shown in FIG. 2A, the body side lower guide roller unit 13 includes a guide lever 41 which is rotatably connected to the vehicle body 10 around an axis O3 extended in the height direction in the rear of the body side lower rail 11 and is formed of a metal plate, for example. Moreover, as shown in FIG. 3, a guide roller 42 is pivotally supported to the tip portion of the guide lever 41 by a support pin 43 in which the axis extends in the height direction. Moreover, as shown in FIG. 2A, a pair of guide rollers 42 (and support pins 43) is disposed with an interval in the front-rear direction (rail length direction).

On the other hand, the rear end portion of the door side lower rail 18 is bent toward the outside of a vehicle. As shown in FIG. 3, both guide rollers 42 of the body side lower guide roller unit 13 are mounted on the door side lower rail 18 so as to be rolled, and thus, the movement of the slide door 20 along the door side lower rail 18 is guided.

As described above, the slide door 20 is guided so as to be approximately flush with the outside surface of the vehicle body 10 (quarter panel 10b) in the fully closed state or to be disposed on the outside surface of the vehicle body 10 (quarter panel 10b) in the opened state.

Next, an operation of the present embodiment will be described.

According to the movement of the slide door 20 in the front-rear direction, the door side lower guide roller unit 16 and the door side center guide roller unit 17 slide on the body side lower rail 11 and the body side center rail 12 respectively and the body side lower guide roller unit 13 slides on the door side lower rail 18, and thus, the door opening 10a is opened and closed. In this case, the door side lower rail 18 on which the body side lower guide roller unit 13 slides is provided in the slide door 20. However, in the fully closed state where the door opening 10a is closed by the slide door 20, the door side lower rail is disposed below the floor surface F, and thus, is not exposed to the vehicle interior. Accordingly, limitations with respect to the design and structure of the slide door 20 (for example, a door trim) are alleviated. Moreover, since the opening and closing of the door opening 10a by the slide door 20 can be realized by only the sliding operation, for example, compared to a case where the hinge is also used as the related art example, a sufficient opening-closing amount (so-called door stroke) is secured.

As described in the details above, according to the present embodiment, the following effects are obtained.

(1) In the present embodiment, in the fully closed state where the door opening 10a is closed by the slide door 20, the door side lower rail 18 on which the body side lower guide roller unit 13 slides is disposed below the floor surface F, and is not exposed to the vehicle interior. Accordingly, limitations with respect to the design and structure of the slide door 20 (for example, a door trim) can be alleviated.

Moreover, since the opening and closing of the door opening 10a by the slide door 20 can be realized by only the sliding operation, for example, compared to the case where the hinge is also used as the related art example, a sufficient opening-closing amount can be secured. Alternatively, compared to a case where a large hinge is also used as the related art example, limitations to a disposition space which is required around the lower portion of the slide door 20 can be alleviated.

(2) The support position of the slide door 20 in the vehicle body 10 includes both support positions P1 and P2 (P1' and P2') of the door side lower guide roller unit 16 and the door side center guide roller unit 17 in the body side lower rail 11 and the body side center rail 12, and a support position P3 (P3') of the body side lower guide roller unit 13 in the door side lower rail 18. Moreover, in the present embodiment, the height difference of the door side center guide roller unit 17 is set with respect to the door side lower guide roller unit 16 and the body side lower guide roller unit 13, and the body side lower guide roller unit 13 is always disposed behind the door side lower guide roller unit 16. Accordingly, lines which connect each of the two support positions of three support positions P1 to P3 (P1' to P3') necessarily draw a triangle T (T') regardless of the opening and closing positions of the slide door 20. Thereby, the slide door 20 can be supported to the vehicle body 10 in a more stable posture due to three support positions P1 to P3 (P1' to P3') regardless of the opening and closing positions.

(3) In the present embodiment, the support position P3 (P3') of the body side lower guide roller unit 13 in the door side lower rail 18 is disposed below the support position P1 (P1') of the door side lower guide roller unit 16 in the body side lower rail 11. Accordingly, as much as the support position P3 (P3') is disposed below the support position P1 (P1'), the triangle T (T') which is drawn by three support positions P1 to P3 (P1' to P3') is enlarged, and thus, the slide door 20 can be supported to the vehicle body 10 in a more stable posture.

(4) In the present embodiment, the body side upper rail which is installed along the upper edge of the door opening 10a or the door side guide roller unit which slides on the body side upper rail is eliminated, and thus, application to the so-called slide door without a door sash (door frame) can be realized, and limitations with respect to the design and structure of the slide door 20 itself or the roof can be alleviated. In addition, for example, a sedan rear door or the like can be applied as the slide door.

Moreover, the embodiment may be modified as follows.

In the embodiment, the door side lower rail 18 is disposed so as to be offset backward with respect to the body side lower rail 11. However, if interference of the body side lower guide roller unit 13, the door side lower guide roller unit 16, or the like can be avoided, the positions in the front-rear direction of the door side lower rail 18 and the body side lower rail 11 may be consistent with each other.

In the embodiment, the guide roller 26 of the door side lower guide roller unit 16 rolls on the body side lower rail 11, and the movement of the slide door 20 along the body side lower rail 11 is guided. On the other hand, instead of the guide roller 26, an appropriate slide body of the door side lower guide roller unit 16 slides on the body side lower rail 11, and the movement of the slide door 20 along the body side lower rail 11 may be guided.

In the embodiment, the guide roller 42 which rolls on the door side lower rail 18 is adopted. However, in addition to this, a guide roller which rolls on the outer surface of the door side lower rail 18 may be separately provided. According to the modification, the movement of the slide door 20 along the door side lower rail 18 can be more securely guided.

In the embodiment, the guide roller 42 of the body side lower guide roller unit 13 rolls on the door side lower rail 18, and thus, the movement of the slide door 20 along the door side lower rail 18 is guided. On the other hand, instead of the guide roller 42, an appropriate slide body of the body side lower guide roller unit 13 slides on the door side lower rail 18, and the movement of the slide door 20 along the door side lower rail 18 may be guided.

In the embodiment, the door side lower rail 18 is disposed below the body side lower rail 11. However, the door side lower rail may be disposed above the body side lower rail 11. Moreover, if interference of the body side lower guide roller unit 13, the door side lower guide roller unit 16, or the like can be avoided, the positions in the height direction of the door side lower rail 18 and the body side lower rail 11 may be consistent with each other.

In the embodiment, if the body side center rail 12 is disposed above the body side lower rail 11, the position in the height direction is optional.

In the embodiment, the front and rear positions of the body side lower guide roller unit 13 and the door side lower guide roller unit 16 may be reversed according to the opening and closing of the slide door 20.

This disclosure may be applied to a front door, and may also be applied to a rear door of a one box car, minivan car, sedan, wagon, or the like.

Therefore, aspects of this disclosure are further described below.

According to a first aspect of this disclosure, there is provided a slide door device for a vehicle, including: a body side lower rail which is disposed below a door opening formed on a side of a vehicle body and extends in a front-rear direction; a body side rail which is disposed above the body side lower rail and behind the door opening and extends in the front-rear direction; a door side lower guide roller unit and a door side guide roller unit which are connected to a slide door, which opens and closes the door opening, and can slide on the body side lower rail and the body side rail respectively; a door side lower rail which is disposed in a lower portion of the slide door positioned below the floor surface in the door opening and extends in the front-rear direction; and a body side lower guide roller unit which is connected to the lower portion of the door opening and can slide on the door side lower rail.

According to the first aspect, due to the movement in a front-rear direction of the slide door, the door side lower guide roller unit and the door side guide roller unit slide on the body side lower rail and the body side rail respectively and the body side lower guide roller unit slides on the door side lower rail, and thus, the slide door opens and closes the door opening. In this case, the door side lower rail on which the body side lower guide roller unit slides is provided in the slide door. However, in the fully closed state where the door opening is closed by the slide door, the door side lower rail is disposed below the floor surface, and thus, is not exposed to the vehicle interior. Accordingly, limitations with respect to the design and structure of the slide door (for example, a door trim) can be alleviated. Moreover, since the opening and closing of the door opening by the slide door can be realized by only the sliding operation, for example, compared to a case where a hinge is also used as the related art example, a sufficient opening-closing amount can be secured.

According to a second aspect of this disclosure, in the slide door device for a vehicle of the first aspect, the body side lower guide roller unit may be disposed behind the door side lower guide roller unit regardless of the opening and closing position of the slide door.

According to the second aspect, the support position of the slide door in the vehicle body includes both support positions of the door side lower guide roller unit and the door side guide roller unit in the body side lower rail and the body side rail, and a support position of the body side lower guide roller unit in the door side lower rail. In addition, a height difference of the door side guide roller unit is set with respect to the door side lower guide roller unit and the body side lower guide roller unit, and the body side lower guide roller unit is always disposed behind the door side lower guide roller unit. Accordingly, lines which connect each of the two support positions of three support positions necessarily draw a triangle regardless of the opening and closing positions of the slide door. Thereby, the slide door can be supported to the vehicle body in a more stable posture by use of three support positions regardless of the opening and closing positions.

According to a third aspect of this disclosure, in the slide door device for a vehicle of the second aspect, the door side lower rail may be disposed below the body side lower rail.

According to the third aspect, as much as the support position of the body side lower guide roller unit in the door side lower rail is disposed below the support position of the door side lower guide roller unit in the body side lower rail, the triangle which is drawn by three support positions is enlarged, and thus, the slide door can be supported to the vehicle body in a more stable posture.

According to this disclosure, it is possible to provide a slide door device for a vehicle capable of securing a sufficient opening-closing amount while alleviating the limitations with respect to the design and structure of a slide door.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A slide door device for a vehicle, comprising:
    a body side lower rail which is disposed below a door opening formed on a side of a vehicle body and extends in a front-rear direction of the vehicle;
    a body side rail which is disposed above the body side lower rail and behind the door opening and extends in the front-rear direction;
    a door side lower guide roller unit which is connected to a slide door, which opens and closes the door opening, and configured to slide on the body side lower rail;
    a door side guide roller unit which is connected to the slide door and configured to slide on the body side rail;
    a door side lower rail which is disposed in a lower portion of the slide door positioned below a floor surface in the door opening and extends in the front-rear direction;
    a body side lower guide roller unit which is connected to the lower portion of the door opening and configured to slide on the door side lower rail; and
    wherein the body side lower rail and the door side lower rail overlap in an upper-lower direction of the vehicle in the fully closed state of the door.

2. The slide door device for a vehicle according to claim 1, wherein the body side lower guide roller unit is disposed at a rear position of the door side lower guide roller unit regardless of the opening and closing position of the slide door.

3. The slide door device for a vehicle according to claim 2, wherein the door side lower rail is disposed below the body side lower rail.

4. The slide door device for a vehicle according to claim 1, wherein the door side lower rail is configured to be provided in place of a body side upper rail which is disposed above the body side rail and extends in the front-rear direction of the vehicle.

5. The slide door device for a vehicle according to claim 1, wherein the slide door device is devoid of a rail installed along an upper edge of the door opening.

* * * * *